(12) United States Patent
Kumhyr et al.

(10) Patent No.: US 7,717,326 B2
(45) Date of Patent: May 18, 2010

(54) METHOD AND SYSTEM FOR PROTECTING DATA

(75) Inventors: David Bruce Kumhyr, Austin, TX (US); Pamela Ann Nesbitt, Tampa, FL (US); Lorin Evan Ullmann, Austin, TX (US); Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/560,243

(22) Filed: Nov. 15, 2006

(65) Prior Publication Data
US 2008/0112300 A1 May 15, 2008

(51) Int. Cl.
*G06K 5/00* (2006.01)
*G06F 17/00* (2006.01)
(52) U.S. Cl. .................... 235/375; 235/380
(58) Field of Classification Search ............ 235/375, 235/380, 449, 435, 492, 487, 486
See application file for complete search history.

(56) References Cited

U.S. PATENT DOCUMENTS

| | | | |
|---|---|---|---|
| 4,325,089 A | 4/1982 | Hsu | |
| 6,398,115 B2 * | 6/2002 | Krause | 235/492 |
| 6,554,194 B1 * | 4/2003 | Sasaki et al. | 235/492 |
| 6,778,066 B2 * | 8/2004 | Smith | 340/5.61 |
| 7,059,535 B2 * | 6/2006 | Rietzler | 235/492 |
| 7,124,955 B2 * | 10/2006 | Lasch et al. | 235/487 |
| 7,163,152 B2 * | 1/2007 | Osborn et al. | 235/486 |
| 7,225,994 B2 * | 6/2007 | Finkelstein | 235/493 |
| 2003/0001722 A1 * | 1/2003 | Smith | 340/5.61 |
| 2004/0181673 A1 | 9/2004 | Lin et al. | |
| 2006/0047570 A1 | 3/2006 | Lenderking et al. | |
| 2006/0213973 A1 * | 9/2006 | Chan et al. | 235/380 |
| 2008/0112300 A1 * | 5/2008 | Kumhyr et al. | 369/83 |

OTHER PUBLICATIONS

Sullivan, "Apparel Maker Tags RFID for Kids' Sleepwear", InformationWeek, Jul. 13, 2005, pp. 1-3, http://www.informationweek.com/story/showArticle.jhtml?articleID=165701942.

Bragg, "Data at Rest Is a Sitting Duck", Redmondmag.com, Mar. 2005, pp. 1-4 http://www.redmondmag.com/columns/print.asp?EditorialsID=911.

* cited by examiner

*Primary Examiner*—Thien M Le
(74) *Attorney, Agent, or Firm*—Yee & Associates, P.C.; Jeffrey S. LaBaw

(57) ABSTRACT

A system for protecting data within a portable storage device. A self-destruct unit associated with the portable storage device is enabled. If the portable storage device is not within a pre-specified route tolerance or if the portable storage device is not at a pre-selected identification checkpoint, an alert message is sent. In response to receiving a particular response, a self-destruct signal is sent to the enabled self-destruct unit. Then the enabled self-destruct unit creates an electromagnetic pulse from a xenon flash tube to render confidential data within the portable storage device unusable.

15 Claims, 3 Drawing Sheets

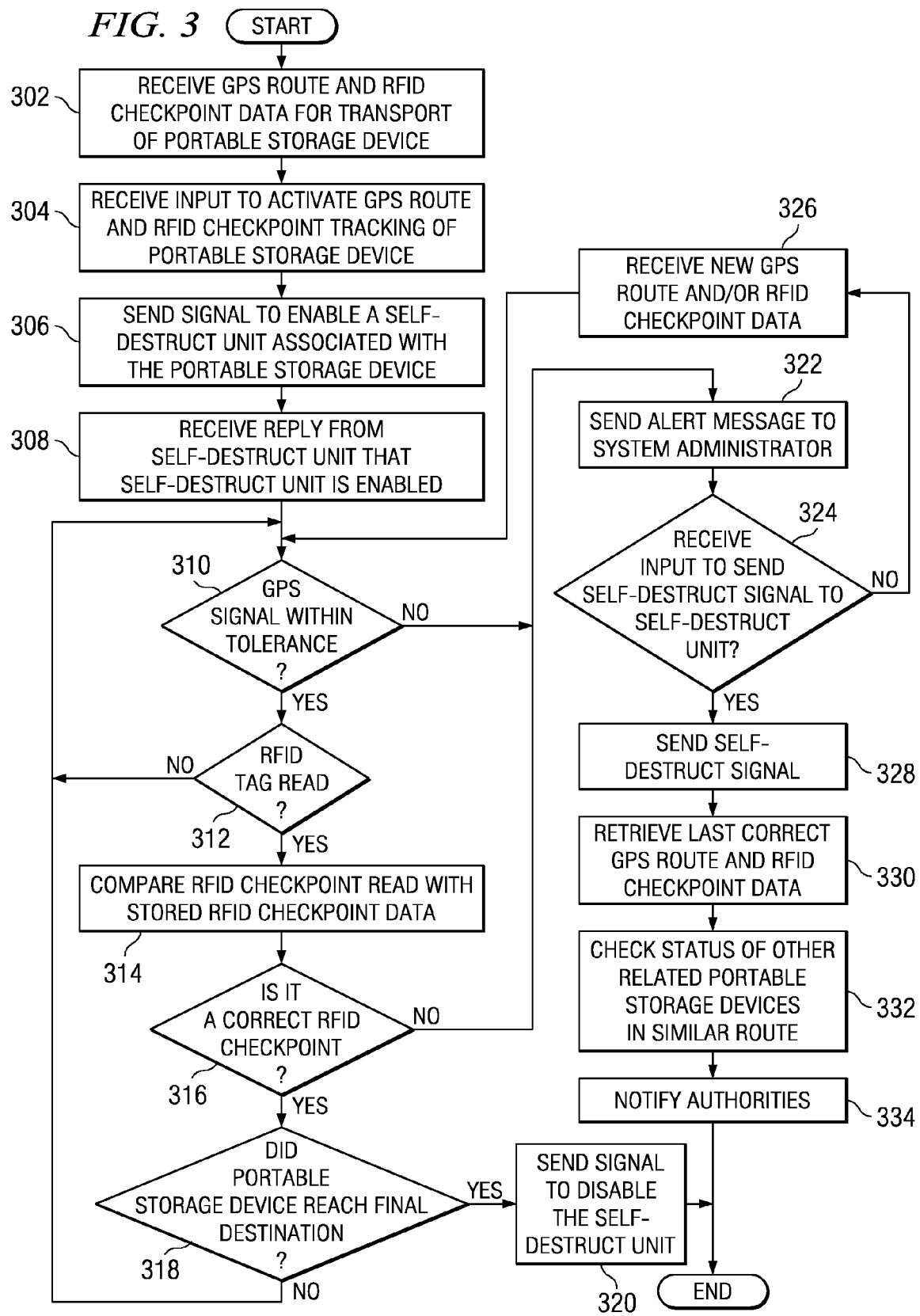

METHOD AND SYSTEM FOR PROTECTING DATA

BACKGROUND OF THE INVENTION

1. Field of the Invention

The present invention relates generally to an improved data processing system. More specifically, the present invention is directed to a computer implemented method and computer usable program code for protecting data within a portable storage device.

2. Description of the Related Art

Today, there are many cases in which data recorded on portable storage devices, such as magnetic tape, floppy disk, compact disk-read only memory (CD-ROM), memory stick, and the like, is considered private and highly confidential. This confidential data may include proprietary programs, trade secrets, customer lists, marketing data, and other highly valuable business and technical information. In view of this, owners of the confidential data have a duty to prevent unauthorized access to the data so as to safeguard the private information and secrets contained within portable storage devices against theft.

Conventional methods employed to safeguard such data includes the use of guards, fences, gates, identification cards, and security door codes to limit access to secure areas. In addition, lock boxes and safes may be utilized to store the portable storage devices, which contain the confidential data. However, these safeguard methods are only effective to the extent that the secure areas, lock boxes, and safes are secure from unauthorized entry.

Further, passwords, personal identification numbers (PINs), and data encryption also are known safeguards for preventing unauthorized access to confidential data contained within portable storage devices. However, as the technology for preventing unauthorized access to data advances, equal advances are made in the methods for gaining unauthorized access to confidential data. Such unauthorized access methods may include decoding or "hacking" user access codes, such as passwords, PINs, and encryption keys, or other independent credentials used to limit access to data or to hide the data making it unreadable.

Therefore, it would be beneficial to have an improved computer implemented method and computer usable program code in a distributed data processing system for protecting data contained within a portable storage device.

SUMMARY OF THE INVENTION

Illustrative embodiments provide a computer implemented method and computer usable program code for protecting data within a portable storage device. A self-destruct unit associated with the portable storage device is enabled. If the portable storage device is not within a pre-specified route tolerance or if the portable storage device is not at a pre-selected identification checkpoint, an alert message is sent. In response to receiving a particular response, a self-destruct signal is sent to the enabled self-destruct unit. Then the enabled self-destruct unit creates an electromagnetic pulse from a xenon flash tube to render confidential data within the portable storage device unusable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart illustrating an exemplary process for protecting data within a portable storage device in accordance with an illustrative embodiment.

DETAILED DESCRIPTION OF THE PREFERRED EMBODIMENT

Figure 1:
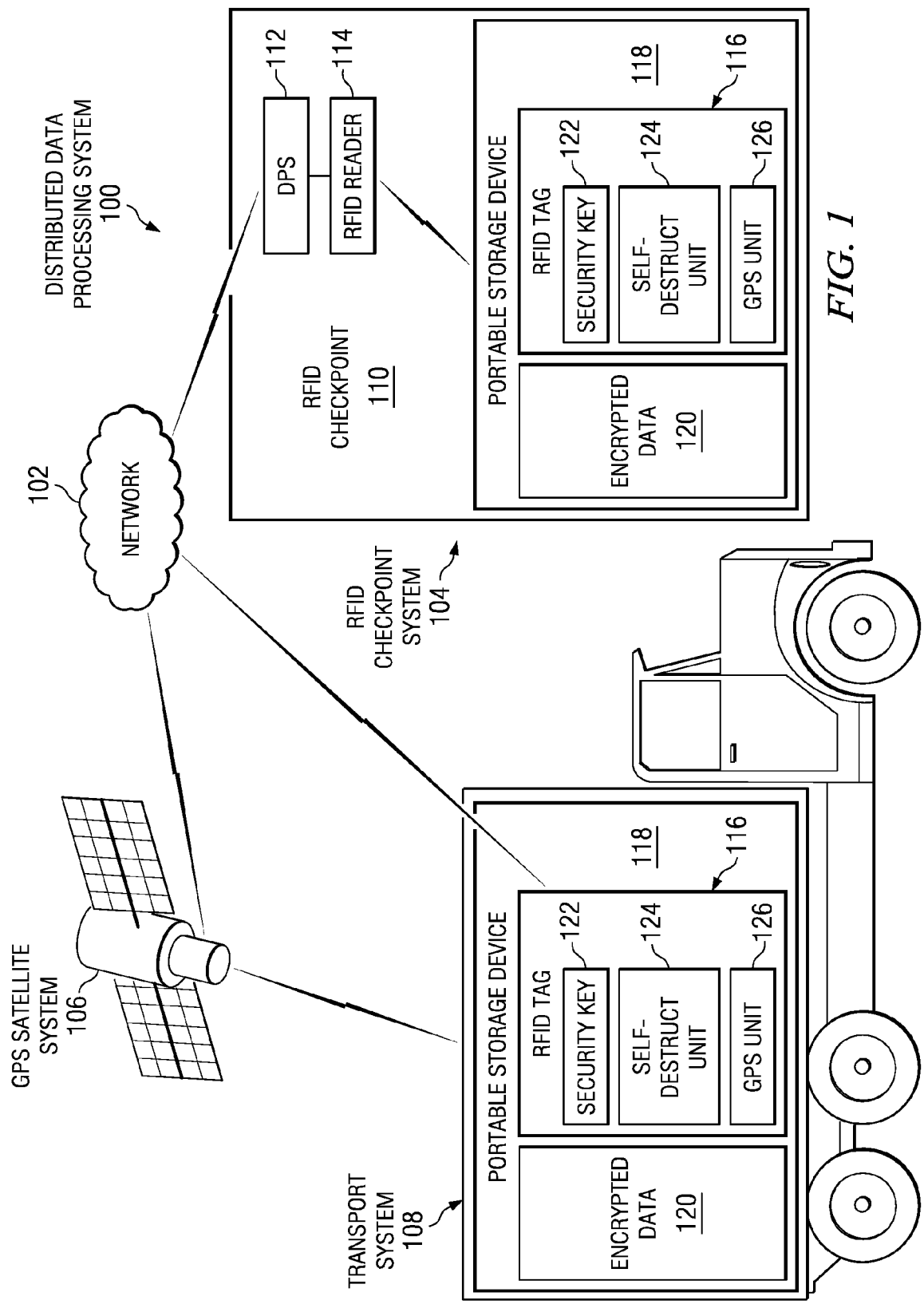
FIG. 1 is a pictorial illustration of a distributed data processing system in which illustrative embodiments may be implemented.

With reference now to the figures, FIG. 1 depicts a pictorial illustration of a distributed data processing system in which illustrative embodiments may be implemented. Distributed data processing system 100 is a network of computers and other devices in which illustrative embodiments may be implemented. Distributed data processing system 100 contains network 102, which is the medium used to provide communication links between the various computers and other devices coupled together within distributed data processing system 100. Network 102 may include several types of connections, such as wire, wireless communication links, or fiber optic cables.

Distributed data processing system 100 includes radio frequency identification (RFID) checkpoint system 104, global positioning system (GPS) satellite system 106, and transport system 108. However, it should be noted that distributed data processing system 100 also may include other systems and devices not shown in this illustration. For example, distributed data processing system 100 may, for example, include servers, clients, storage units, and other devices not shown. Moreover, distributed data processing system 100 may, for example, represent the Internet with network 102 representing a worldwide collection of networks and gateways that use the transmission control protocol/internet protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Thus, FIG. 1 is only intended as an exemplary illustration and is not meant as an architectural limitation for different illustrative embodiments.

In this depicted example of FIG. 1, RFID checkpoint system 104, GPS satellite system 106, and transport system 108 are coupled to network 102 by wire and wireless communication links. As a result, RFID checkpoint system 104, GPS satellite system 106, and transport system 108 may freely share data across distributed data processing system 100. RFID checkpoint system 104 may, for example, represent a plurality of RFID checkpoints located within a local area network (LAN) or a wide area network (WAN). Further, RFID checkpoint system 104 may reside within a single entity or a combination of different entities. An entity may, for example, represent a business, company, government agency, educational institution, research facility, and the like.

RFID checkpoint system 104 also may represent a pre-selected series of RFID checkpoints along a pre-specified transportation route. In other words, a pre-selected series means that a system administrator selects a series of RFID checkpoints in a specific order. The RFID checkpoints are checkpoint locations for identifying and monitoring objects, such as portable storage devices, in transit. A pre-specified transportation route means that the system administrator specifically defines the route of transport between the pre-selected series of RFID checkpoints.

For example, RFID checkpoint system 104 may represent a home office RFID checkpoint in New York, N.Y., a subsequent RFID checkpoint in Indianapolis, Ind., a next subsequent RFID checkpoint in Denver, Colo., and a final destination RFID checkpoint in Los Angeles, Calif. Thus, in this example, the pre-specified transportation route is the pathway selected by the system administrator between the New York, Indianapolis, Denver, and Los Angeles RFID checkpoints. Further, each RFID checkpoint in the pre-selected series must be used in the proper order along the pre-specified transportation route to be in compliance with security parameters.

In addition, the system administrator also sets a pre-specified route variance tolerance for the pre-specified transportation route. The pre-specified route tolerance is an amount of variance or discrepancy from the pre-specified transportation route that the system administrator determines as acceptable. In other words, an amount of variance from the pre-specified transportation route that will not trigger a security alert. For example, the system administrator may set the pre-specified route tolerance at 5 miles, which allows up to a 5 mile variance from the pre-specified transportation route without triggering a security alert. Or, the system administrator may set the pre-specified route tolerance to a geographical location, such as, for example, a metropolitan area or a state.

RFID checkpoint 110 represents an RFID checkpoint station within RFID checkpoint system 104. RFID checkpoint 110 is an identification checkpoint along the pre-specified transportation route for portable storage devices, such as portable storage device 118. An identification checkpoint is a location where portable storage devices are checked in, identified, and monitored for security purposes during transport. RFID checkpoint 110 includes data processing system 112 and RFID reader 114. However, it should be noted that RFID checkpoint 110 may include more or fewer components as necessary to accomplish processes of illustrative embodiments.

Data processing system 112 may represent one or more data processing systems coupled together by network 102. Data processing system 112 may be any suitable computer, such as an IBM® eServer™ computer or IntelliStation® computer, which are products of International Business Machines Corporation, located in Armonk, N.Y. Also, data processing system 112 receives, collects, and processes data for distributed data processing system 100. Furthermore, a system administrator my input data, such as GPS route information and RFID checkpoint information, into data processing system 112.

RFID reader 114 is coupled to data processing system 112 and may represent one or more RFID readers. Data processing system 112 utilizes RFID reader 114 to read or scan RFID tag 116. RFID is a generic term for technologies that use radio waves for automatic identification of objects. RFID technology allows for non-contact reading by utilizing an RFID tag. The RFID tag is an item that may be attached to or incorporated into an object. The RFID tag is made up of an RFID chip that is attached to an antenna. Active RFID tags, due to their onboard power supply, are able to conduct a "session" with an RFID reader. The RFID reader or scanner is a transmitter/receiver that reads the contents of RFID tags that are in the vicinity of the reader. For example, RFID reader 114 converts the radio waves from RFID tag 116 into digital data that may then be conveyed to data processing system 112.

RFID tag 116 is associated with portable storage device 118. In other words, RFID tag 116 is attached to, or attached near, portable storage device 118. RFID tag 116 may, for example, contain data, such as a unique identification number, description of the contents of portable storage device 118, GPS and RFID checkpoint data, number of read/write operations performed on portable storage device 118, and end-of-life date for portable storage device 118. Data processing system 112 may use this data obtained by RFID reader 114 from RFID tag 116 to, for example, alert the system administrator of unauthorized access to the confidential data contained within portable storage device 118. Or, to alert the system administrator to initiate transfer of the confidential data contained within portable storage device 118 to another portable storage device because the end-of-life date for portable storage device 118 is within a pre-determined time. The pre-determined time may, for example, be one week, one month, three months, six months, or one year.

Portable storage device 118 may, for example, represent a floppy disk, magnetic tape, CD-ROM, memory stick, or similar storage medium. Also, portable storage device 118 may represent a portable media enclosure, such as, for example, a shipping container that stores one or more portable storage devices, or a media library that houses one or more stacks of portable storage devices. Further, portable storage device 118 may include other electronic devices, such as, for example, a complimentary metal oxide semiconductor (CMOS) based processor, a dynamic random access memory (DRAM) device, and the like, besides floppy disks, magnetic tapes, CD-ROMs, and memory sticks.

Portable storage device 118 contains an entity's confidential data. In this particular example of FIG. 1, the data is encrypted for increased security purposes. However, it should be noted that illustrative embodiments are not restricted to only safeguarding encrypted data. A system administrator may utilize illustrative embodiments to safeguard data that is not encrypted as well.

An encryption algorithm uses a "security key," which is a binary number that is typically from 40 to 256 bits in length, to encrypt the confidential data. The greater the number of bits in the security key, the more possible key combinations and the longer it will take for a data thief to break the code. The data are encrypted, or "locked," by combining the bits in the security key mathematically with the data bits. At the receiving end, the security key is used to "unlock" the code and restore the original data. Both sender and receiver use the same security key to encrypt and decrypt the data.

Because portable storage device 118 contains encrypted data 120, a security key is necessary to decrypt or decode the data later when storage device 118 arrives at its destination. Consequently, the system administrator may, for example, place the security key, such as security key 122, within RFID tag 116.

However, since it is possible for a data thief to eventually hack a security key given enough time, illustrative embodiments provide an increased level of data security by adding a self-destruct unit, such as self-destruct unit 124, to portable storage device 118. In this particular example, self-destruct unit 124 also resides within RFID tag 116. However, it should be noted that illustrative embodiments are not limited to placing self-destruct unit 124 within RFID tag 116. Self-destruct unit 124 may reside anywhere within portable storage device 118. For example, self-destruct unit 124 may be placed on or within the portable media enclosure, which contains the one or more portable storage devices. Or, self-destruct unit 124 may be associated with each portable storage device stack within the media library.

Self-destruct unit 124 may, for example, be a high energy xenon flash pulse tube, which creates an electromagnetic pulse (EMP). However, it should be noted that illustrative embodiments are not limited to only using a high energy xenon flash pulse tube to emit an EMP. Illustrative embodiments may utilize any suitable device to create the EMP.

Self-destruct unit 124 uses the EMP to destroy security key 122. As a result, a data thief is unable to use security key 122 to decrypt encrypted data 120. Thus, the confidential data within portable storage device 118 is rendered unusable. However, it should be noted that illustrative embodiments are not restricted to using the EMP to only destroy security key 122. Illustrative embodiments also may use the EMP to destroy all, or only a portion, of encrypted data 120 or unencrypted confidential data that is contained within portable storage device 118 thereby rendering the data unusable. Also, it should be noted that the destruction of security key 122 and/or encrypted data 120 by the EMP may be accomplished without shielding and without danger to other portable storage devices in the area.

As a further security enhancement, illustrative embodiments include a GPS unit, such as GPS unit 126, within RFID tag 116. However, it should be noted that illustrative embodiments are not limited to including GPS unit 126 within RFID tag 116. GPS unit 126 may reside anywhere within portable storage device 118. Alternatively, GPS unit 126 may reside on or within a shipping container that contains a plurality of portable storage devices.

Illustrative embodiments utilize GPS unit 126 to track the location of portable storage device 118 in real time once enabled by the system administrator. Consequently, if portable storage device 118 deviates from the pre-defined transportation route, then data processing system 112 alerts the system administrator to the deviation or variance beyond an acceptable tolerance. If after receiving the GPS variance alert the system administrator suspects theft, then the system administrator may send a self-destruct signal via network 102 to self-destruct unit 124 to destroy security key 122 and/or encrypted data 120. Alternatively, data processing system 112 may automatically send a self-destruct signal to self-destruct unit 124 in addition to or instead of sending an alert to the system administrator if portable storage device 118 deviates from the pre-specified GPS route.

GPS satellite system 106 represents a network of GPS satellites. GPS is a satellite-based radio navigation system run by the United States Department of Defense. GPS is designed so that signals from at least four satellites are available anywhere on earth, which are sufficient to compute the current location of GPS unit 126 to within 20 meters. Consequently, data processing system 112 utilizes GPS satellite system 106 to receive location data for GPS unit 126 at any given time via network 102.

Transport system 108 may, for example, represent any type of transportation service, such as a courier, trucking line, railway system, airline system, or any combination thereof. The system administrator uses transport system 108 to transport portable storage device 118 from one RFID checkpoint to another. Transport system 108 transports portable storage device 118 according to the system administrator's pre-selected series of RFID checkpoints, along the pre-specified transportation route, which the system administrator inputs into data processing system 112. It should be noted that data processing system 112 maintains communication with portable storage device 118 via network 102 when portable storage device 118 is in transit.

Figure 2:
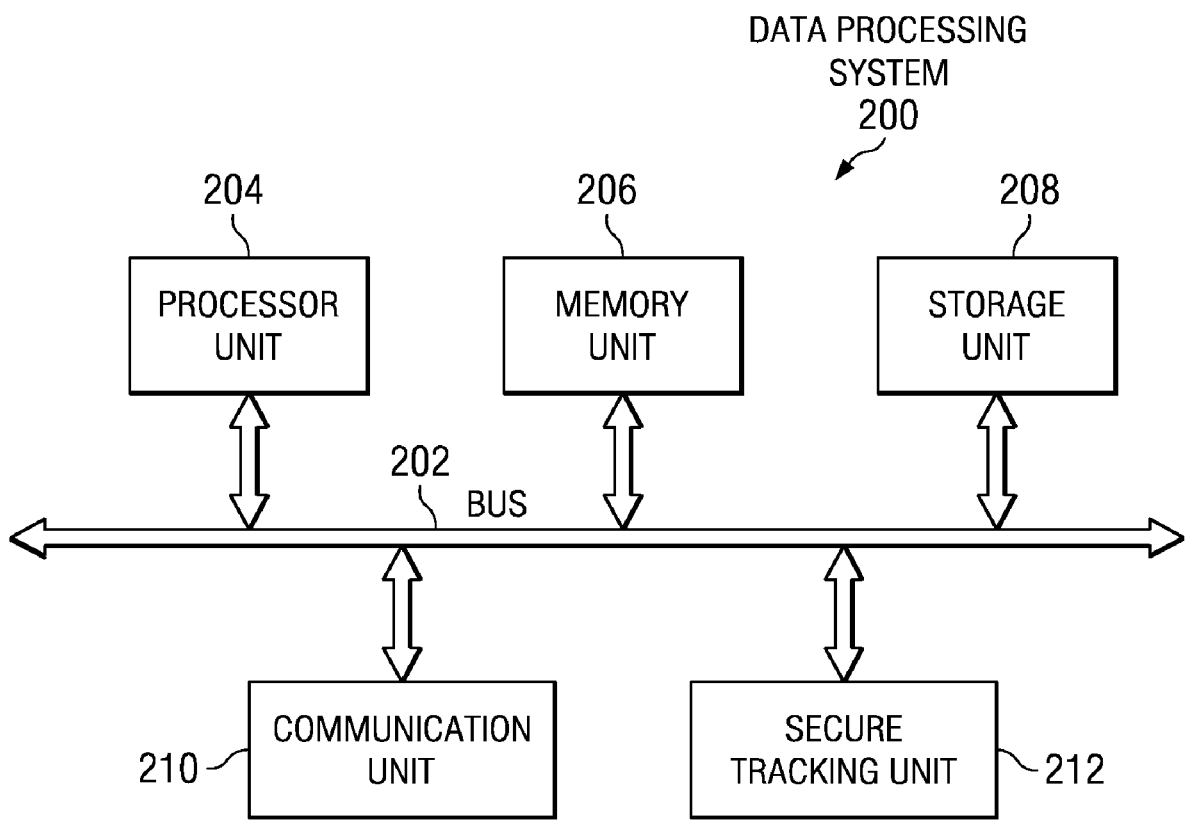
FIG. 2 is a block diagram of a data processing system in which illustrative embodiments may be implemented.

With reference now to FIG. 2, a block diagram of a data processing system is depicted in which illustrative embodiments may be implemented. Data processing system 200 may, for example, be data processing system 112 in FIG. 1. In this illustrative example of FIG. 2, data processing system 200 utilizes a bus architecture, such as bus 202. Bus 202 may include one or more buses. In addition, bus 202 may be implemented using any type of communication fabric or architecture that provides for a transfer of data between the different components and devices coupled to bus 202.

Data processing system 200 includes processor unit 204, memory unit 206, storage unit 208, communication unit 210, and secure tracking unit 212 connected to bus 202. However, it should be noted that data processing system 200 is only shown for exemplary purposes and is not meant as an architectural limitation to illustrative embodiments. In other words, data processing system 200 may include more or fewer components as necessary to accomplish processes of illustrative embodiments for protecting confidential data stored within a portable storage device, such as, for example, portable storage device 118 in FIG. 1.

Processor unit 204 provides the data processing capabilities of data processing system 200. An operating system runs on processor unit 204 and coordinates and provides control of various components within data processing system 200. In addition, software applications executing on data processing system 200 may run in conjunction with the operating system.

Storage unit 208 is a non-volatile memory or storage device that may, for example, be configured as read only memory (ROM) and/or flash ROM to provide the non-volatile memory for storing the operating system and/or user-generated data. Storage unit 208 stores instructions or computer usable program code for the operating system and applications. The instructions are loaded into memory unit 206 for execution by processor unit 204. Processor unit 204 performs processes of illustrative embodiments by executing the computer usable program code that is loaded into memory unit 206.

The user-generated data stored within storage unit 208 may, for example, be an entity's confidential data, an RFID identification number to uniquely identify an RFID tag, such as RFID tag 116 in FIG. 1, a security key, such as security key 122 in FIG. 1, which is used to decode encrypted data, such as encrypted data 120 in FIG. 1. In addition, a self-destruct code may be stored within storage unit 208, which is used to cause a self-destruct unit, such as self-destruct unit 124 in FIG. 1, to create an EMP to destroy the security key and/or encrypted data. Also, end-of-life data for the portable storage device may be stored within storage unit 208, which is used to alert the system administrator to initiate transfer of confidential data to a different portable storage device prior to the end-of-life date. Further, GPS route data and RFID checkpoint data may be stored within storage unit 208.

Data processing system 200 uses communication unit 210 to communicate with a plurality of systems, such as RFID checkpoint system 104, GPS satellite system 106, and transport system 108 in FIG. 1, via a network, such as network 102 in FIG. 1. In addition, data processing system 200 uses communication unit 210 to communicate with the self-destruct unit associated with the portable storage device. Communication unit 210 may include one or more devices used to transmit and receive data. For example, communication unit 210 may include a modem and/or a network adapter to send and receive wire and wireless transmissions.

Data processing system 200 uses secure tracking unit 212 to track the portable storage device when activated by the system administrator. Secure tracking unit 212 compares the stored pre-specified GPS route and pre-selected RFID checkpoint series data to RFID tag and GPS unit data obtained from an RFID checkpoint system and GPS satellite system, such as RFID checkpoint system 104 and GPS satellite system 106 in FIG. 1, to determine if any discrepancy exists between the stored and obtained data. If a discrepancy, or deviation beyond an acceptable tolerance, exists between the data obtained from the RFID tag and GPS unit and the stored data, secure tracking unit 212 sends an alert to inform the system administrator of the deviation. Alternatively, secure tracking unit 212 may, for example, automatically send a self-destruct signal to the self-destruct unit instead of or in addition to sending an alert to the system administrator when secure tracking unit 212 determines a deviation from the stored GPS route and RFID checkpoint data.

It should be appreciated by those of ordinary skill in the art that the system administrator of data processing system 200 may enable and disable secure tracking unit 212 independently of other data processing system 200 components. Furthermore, it should be noted that secure tracking unit 212 may be implemented entirely as software, hardware, or as a combination of software and hardware components. Moreover, even though FIG. 2 depicts data processing system 200 as including secure tracking unit 212, secure tracking unit 212 may, for example, reside within a remote data processing system.

Illustrative embodiments provide a computer implemented method and computer usable program code for protecting data within a portable storage device. A data processing system sends a signal to enable a self-destruct unit, which is associated with the portable storage device, in response to receiving an input from a system administrator to track the portable storage device. The data processing system utilizes GPS route and RFID checkpoint data inputted by the system administrator to monitor the portable storage device while in transit. If a GPS signal from a GPS unit associated with the portable storage device is not within a pre-specified GPS route tolerance or if an RFID tag associated with the portable storage unit is not read by an RFID reader at a pre-selected RFID checkpoint, the data processing system sends an alert message to the system administrator alerting the system administrator of the situation. In response to receiving an input from the system administrator to send a self-destruct signal, the data processing system sends the self-destruct signal to the self-destruct unit. Upon receiving the self-destruct signal, the self-destruct unit uses a high energy xenon flash tube to create an EMP. The EMP renders the confidential data within the portable storage device unusable by destroying the security key and/or the confidential data, itself.

Hence, an entity utilizing an illustrative embodiment is able to increase security of data stored within a portable storage device. Consequently, the entity is more confident that the data is truly secure. Also, illustrative embodiments may discourage would-be thieves from stealing portable storage devices so protected. Furthermore, an entity may use illustrative embodiments without fear of harm to humans or other portable storage devices in the area, even though illustrative embodiments do not use shielding.

With reference now to FIG. 3, a flowchart illustrating an exemplary process for protecting data within a portable storage device is shown in accordance with an illustrative embodiment. The process shown in FIG. 3 may be implemented in a data processing system, such as, for example, data processing system 200 in FIG. 2.

The process begins when the data processing system receives GPS route and RFID checkpoint data inputs from a system administrator in preparation of transport of a portable storage device, such as portable storage device 118 in FIG. 1 (step 302). Subsequent to receiving the GPS route and RFID checkpoint data in step 302, the data processing system receives an input from the system administrator to activate GPS route and RFID checkpoint tracking of the portable storage device by a secure tracking unit, such as secure tracking unit 212 in FIG. 2 (step 304). After receiving the input to activate GPS route and RFID checkpoint tracking in step 304, the data processing system sends a signal to enable a self-destruct unit, such as self-destruct unit 124 in FIG. 1, which is associated with the portable storage device (step 306).

Subsequent to sending the signal to enable the self-destruct unit in step 306, the data processing system receives a reply from the self-destruct unit that the self-destruct unit is enabled (step 308). After receiving the reply that the self-destruct unit is enabled in step 308, the data processing system uses the secure tracking unit to make a determination as to whether a GPS signal from a GPS unit, such as GPS unit 126 in FIG. 1, associated with the portable storage device is within an acceptable pre-specified route tolerance (step 310). An acceptable pre-specified route tolerance may, for example, be 1, 5, 10, 50, or 100 miles within the stored GPS route data inputted by the system administrator. Alternatively, an acceptable pre-specified route tolerance may, for example, be within a specified city, state, region, territory, or country.

If the GPS signal from the GPS unit is within an acceptable pre-specified route tolerance, yes output of step 310, then the secure tracking unit makes a determination as to whether an RFID tag is read by an RFID reader at an RFID checkpoint. For example, RFID tag 116 is read by RFID reader 114 at RFID checkpoint 110 in FIG. 1. If the RFID tag is not read, no output of step 312, then the process returns to step 310 where the secure tracking unit continues to determine if the GPS signal from the GPS unit is within an acceptable pre-specified route tolerance. If the RFID tag is read, yes output of step 312, then the secure tracking unit compares the RFID checkpoint read with stored RFID checkpoint data inputted by the system administrator (step 314).

Subsequent to comparing the RFID checkpoint read with the stored RFID checkpoint data in step 314, the secure tracking unit makes a determination as to whether the RFID checkpoint is the correct RFID checkpoint according to a pre-selected series of RFID checkpoints by the system administrator (step 316). If the RFID checkpoint is not the correct RFID checkpoint, no output of step 316, then the process proceeds to step 322. If the RFID checkpoint is the correct RFID checkpoint, yes output of step 316, then the secure tracking device makes a determination as to whether the portable storage device reached its final destination (step 318).

If the portable storage device did not reach its final destination, no output of step 318, then the process returns to step 310 where the secure tracking unit continues to determine if the GPS signal from the GPS unit is within an acceptable pre-specified route tolerance. If the portable storage device did reach its final destination, yes output of step 318, then the data processing system sends a signal to disable the self-destruct unit (step 320). The process terminates thereafter.

Returning now to step 310, if the GPS signal from the GPS unit is not within an acceptable pre-specified route tolerance, no output of step 310, then the secure tracking unit sends an alert message to the system administrator alerting the system administrator that the GPS signal is not within an acceptable route tolerance (step 322). After the secure tracking unit sends the alert message to the system administrator in step 322, the data processing system makes a determination as to whether the data processing system receives an input from the system administrator to send a self-destruct signal to the self-destruct unit (step 324). If the data processing system does not receive an input to send the self-destruct signal, no output of step 324, then the data processing system receives new GPS route and/or RFID checkpoint data from the system administrator (step 326). In other words, the system administrator inputs the new GPS route and/or RFID checkpoint data to accommodate any variance identified in step 310 and/or step 316. Subsequent to receiving the new GPS route and/or RFID checkpoint data in step 326, the process returns to step 310 where the secure tracking unit continues to determine if the GPS signal from the GPS unit is within an acceptable pre-specified route tolerance.

Returning again to step 324, if the data processing system does receive an input to send the self-destruct signal, yes output of step 324, then the data processing system sends the self-destruct signal to the self-destruct unit (step 328). Upon receiving the self-destruct signal from the data processing system, the self-destruct unit utilizes a xenon flash tube to create an EMP to destroy a security key and/or confidential data, such as security key 122 and encrypted data 120 in FIG. 1, which reside within the portable storage device. In addition to sending the self-destruct signal in step 328, the data processing system obtains the last known correct GPS route and RFID checkpoint data for the portable storage device (step 330). Further, the data processing system checks the status of other related portable storage devices in a similar route (step 332). Subsequent to retrieving the last known correct GPS route and RFID checkpoint data in step 330 and checking the status of other related portable storage devices in step 332, the data processing system notifies the proper authorities (step 334). The process terminates thereafter.

Thus, illustrative embodiments provide a computer implemented method, system, and computer usable program code for protecting data within a portable storage device. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for protecting data within a portable storage device, the computer implemented method comprising:
    enabling a self destruct unit associated with the portable storage device to form an enabled self-destruct unit;
    determining if the portable storage device is within a pre-specified route tolerance;
    determining if the portable storage device is at a pre-selected identification checkpoint;
    sending an alert message if the portable storage device is not within the pre-specified route tolerance or if the portable storage device is not at the pre-selected identification checkpoint; and
    responsive to receiving a particular response, sending a self destruct signal to the enabled self destruct unit, wherein the enabled self destruct unit creates an electromagnetic pulse from a xenon flash tube to render confidential data within the portable storage device unusable.

2. The computer implemented method of claim 1, further comprising:
    automatically sending the self-destruct signal to the enabled self destruct unit, wherein the enabled self destruct unit creates the electromagnetic pulse from the xenon flash tube to render the confidential data within the portable storage device unusable if the portable storage device is not within the pre-specified route tolerance or if the portable storage device is not at the pre-selected identification checkpoint.

3. The computer implemented method of claim 1, wherein a radio frequency identification tag is associated with the portable storage device, and wherein the radio frequency identification tag includes an end-of-life date for the portable storage device, and wherein an alert is sent to a system administrator to initiate a transfer of the confidential data to another portable storage device when the end-of life date is within a pre-determined time period.

4. The computer implemented method of claim 3, wherein the radio frequency identification tag includes the self-destruct unit, a ground positioning unit, and a security key that is used to decrypt encrypted confidential data contained within the portable storage device.

5. The computer implemented method of claim 1, wherein the portable storage device is one of a floppy disk, magnetic tape, compact disc—read only memory, memory stick, portable media enclosure, or media library.

6. A computer program product for protecting data within a portable storage device, the computer program product comprising:
- a computer usable medium having computer usable program code embodied therein, the computer usable medium comprising:
  - first computer usable program code configured to enable a self-destruct unit associated with the portable storage device to form an enabled self-destruct unit;
  - second computer usable program code configured to determine if the portable storage device is within a pre-specified route tolerance;
  - third computer usable program code configured to determine if the portable storage device is at a pre-selected identification checkpoint;
  - fourth computer usable program code configured to send an alert message if the portable storage device is not within the pre-specified route tolerance or if the portable storage device is not at the pre-selected identification checkpoint; and
  - fifth computer usable program code configured to send a self-destruct signal to the enabled self-destruct unit in response to receiving a particular response, wherein the enabled self-destruct unit creates an electromagnetic pulse from a xenon flash tube to render confidential data within the portable storage device unusable.

7. The computer usable medium of claim 6, further comprising:
- sixth computer usable program code configured to automatically send the self-destruct signal to the enabled self-destruct unit, wherein the enabled self-destruct unit creates the electromagnetic pulse from the xenon flash tube to render the confidential data within the portable storage device unusable if the portable storage device is not within the pre-specified route tolerance or if the portable storage device is not at the pre-selected identification checkpoint.

8. The computer usable medium of claim 6, wherein a radio frequency identification tag is associated with the portable storage device, and wherein the radio frequency identification tag includes an end-of-life date for the portable storage device, and wherein an alert is sent to a system administrator to initiate a transfer of the confidential data to another portable storage device when the end-of-life date is within a pre-determined time period.

9. The computer usable medium of claim 8, wherein the radio frequency identification tag includes the self-destruct unit, a ground positioning unit, and a security key that is used to decrypt encrypted confidential data contained within the portable storage device.

10. The computer usable medium of claim 6, wherein the portable storage device is one of a floppy disk, magnetic tape, compact disc—read only memory, memory stick, portable media enclosure, or media library.

11. A system for protecting data, comprising:
- a network for providing communication capabilities between components of the system;
- a portable storage device for storing confidential data, wherein an identification tag is associated with the portable storage device for identifying the portable storage device, and wherein a self-destruct unit is associated with the portable storage device for rendering the confidential data unusable, and wherein a ground positioning unit is associated with the portable storage device for locating the portable storage device;
- an identification reader coupled to the network for reading the identification tag at a pre-selected identification checkpoint;
- a bus system;
- a storage device connected to the bus system, wherein the storage device includes a set of instructions; and
- a processing unit connected to the bus system, wherein the processing unit executes the set of instructions to enable the self-destruct unit to form an enabled self-destruct unit, determine if the portable storage device is within the pre-specified route tolerance using the ground positioning unit, determine if the portable storage device is at the pre-selected identification checkpoint using the identification reader, send an alert message if the portable storage device is not within the pre-specified route tolerance or if the portable storage device is not at the pre-selected identification checkpoint, and send a self-destruct signal via the network to the enabled self-destruct unit in response to receiving a particular response, wherein the enabled self-destruct unit creates an electromagnetic pulse from a xenon flash tube to render the confidential data within the portable storage device unusable.

12. The system of claim 11, wherein the processing unit executes a further set of instructions to automatically send the self-destruct signal to the enabled self-destruct unit, wherein the enabled self-destruct unit creates the electromagnetic pulse from the xenon flash tube to render the confidential data within the portable storage device unusable if the portable storage device is not within the pre-specified route tolerance or if the portable storage device is not at the pre-selected identification checkpoint.

13. The system of claim 11, wherein the identification tag includes an end-of-life date for the portable storage device, and wherein an alert is sent to a system administrator to initiate a transfer of the confidential data to another portable storage device when the end-of-life date is within a pre-determined time period.

14. The system of claim 11, wherein the portable storage device is one of a floppy disk, magnetic tape, compact disc—read only memory, memory stick, portable media enclosure, or media library.

15. The system of claim 11, wherein the identification tag includes the self-destruct unit, the ground positioning unit, and a security key that is used to decrypt encrypted confidential data contained within the portable storage device.

* * * * *